Aug. 29, 1967  P. J. WEAVER  3,338,267
MIXING VALVE FOR LAVATORIES
Original Filed Nov. 20, 1961  4 Sheets-Sheet 1

INVENTOR.
PAUL J. WEAVER
BY
ATTORNEYS

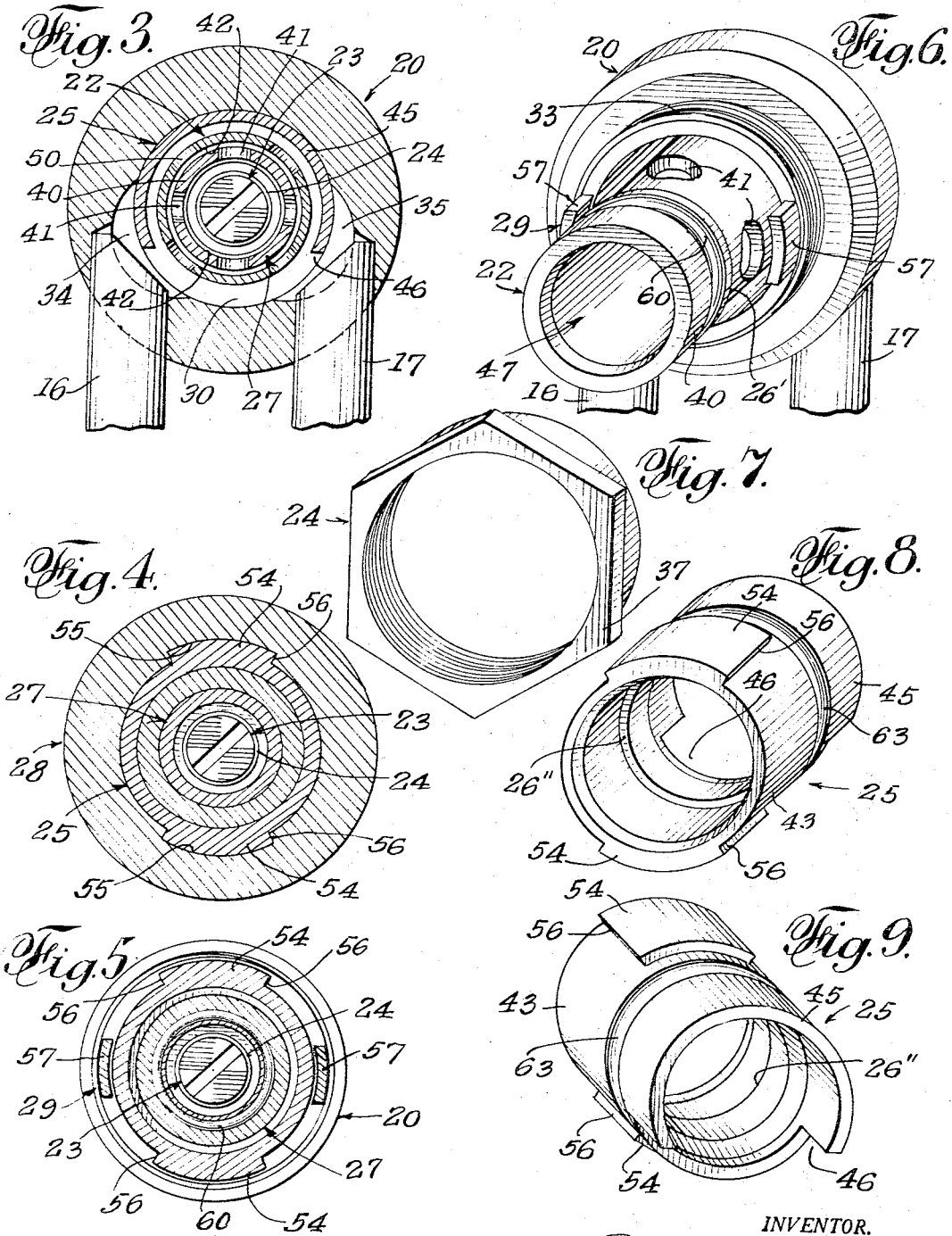

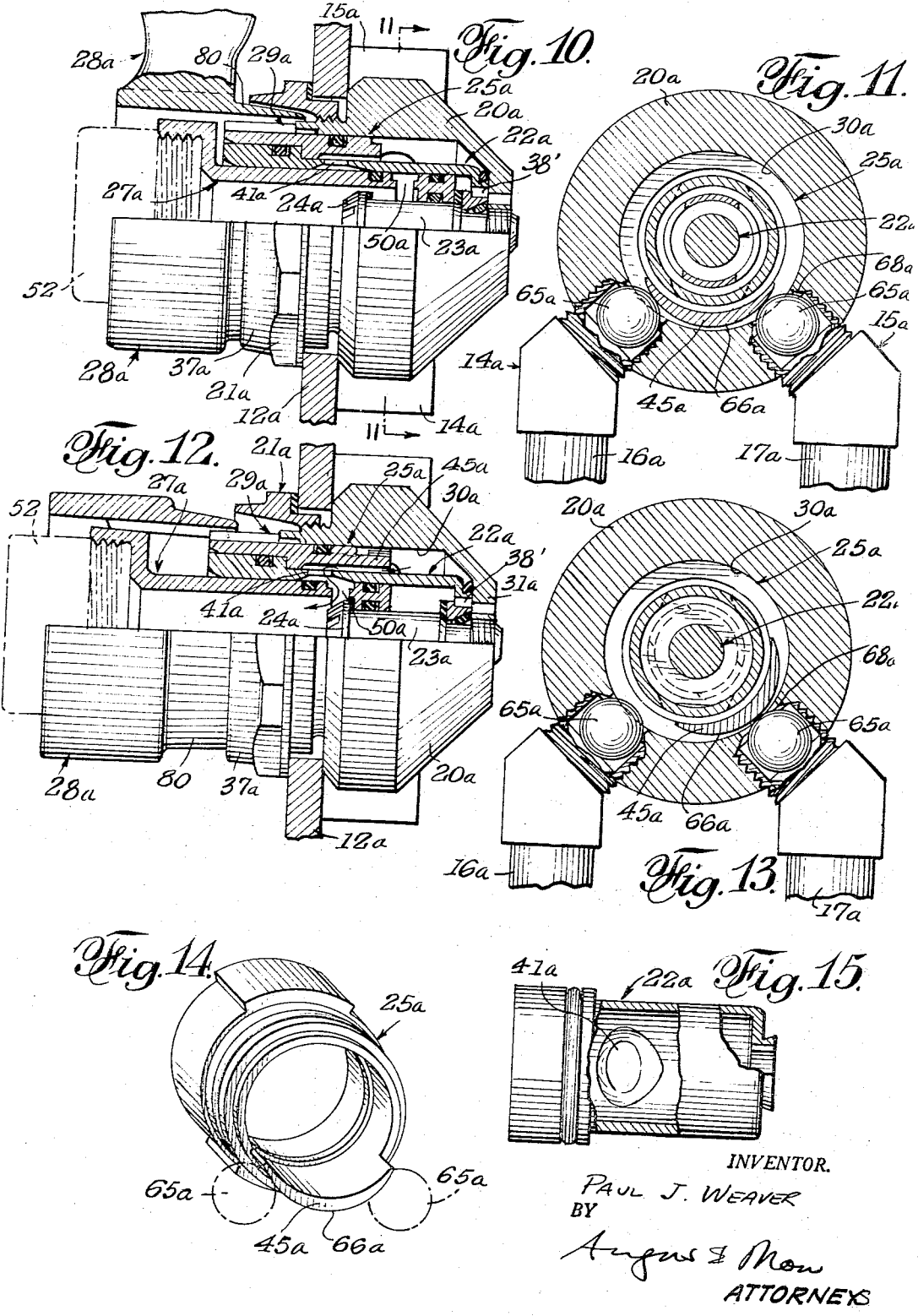

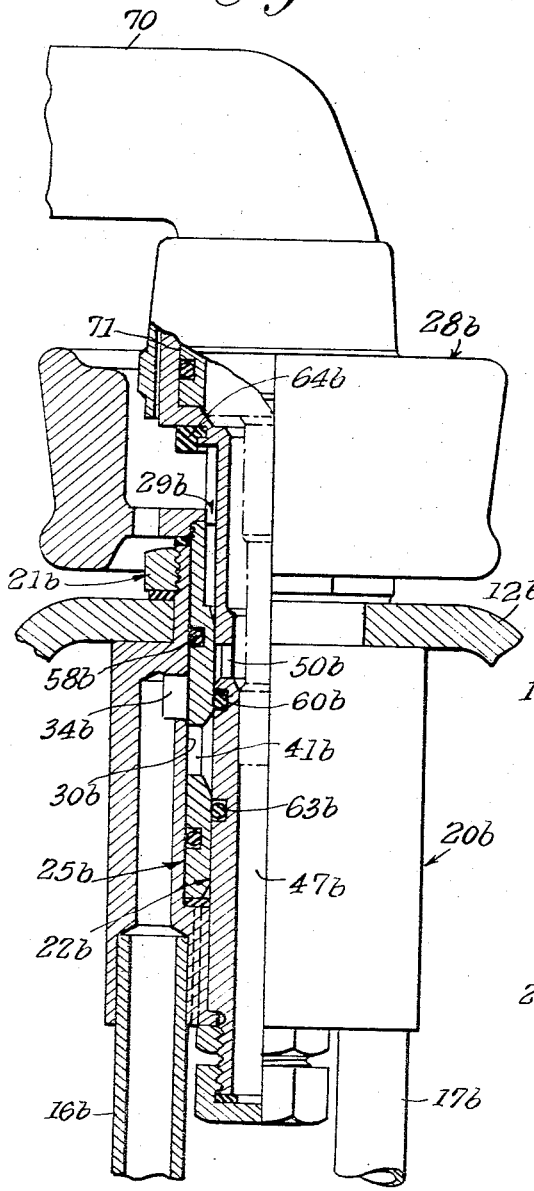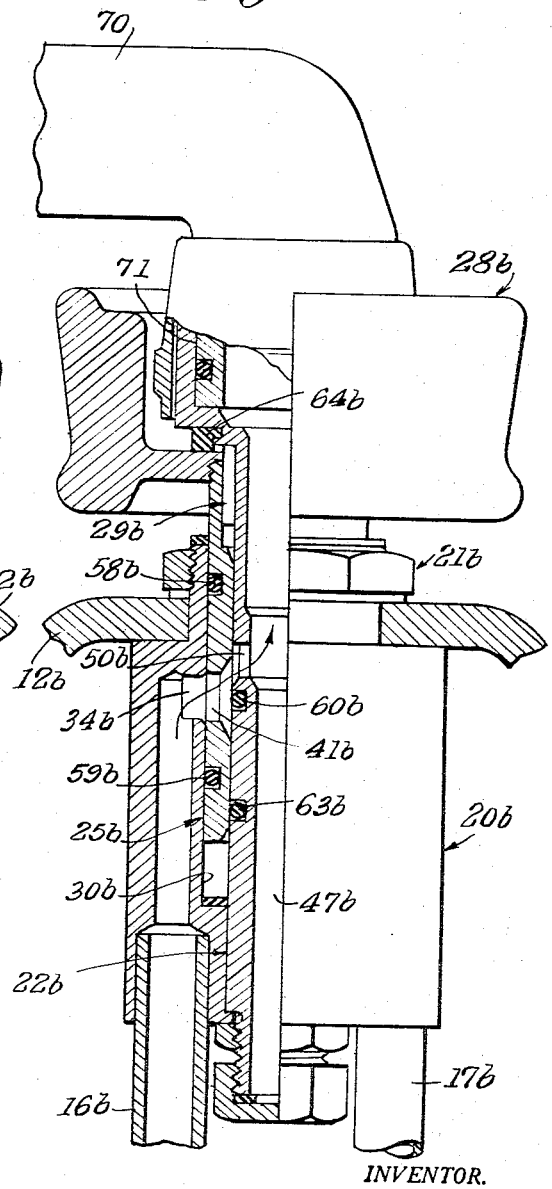
INVENTOR.
PAUL J. WEAVER
BY
ATTORNEYS

United States Patent Office 3,338,267
Patented Aug. 29, 1967

3,338,267
MIXING VALVE FOR LAVATORIES
Paul J. Weaver, Pasadena, Calif., assignor to Graning Enameling Company, El Monte, Calif., a corporation of California
Original application Nov. 20, 1961, Ser. No. 153,387. Divided and this application Nov. 17, 1964, Ser. No. 411,901
14 Claims. (Cl. 137—625.17)

This application is a division of applicant's co-pending patent application, Ser. No. 153,387, now abandoned, filed Nov. 20, 1961, entitled, "Mixing Valve for Lavatories."

This invention relates to a mixing valve for lavatories and other similar purposes and has for an object to provide a valve especially adapted for incorporation, as a single unit, in a lavatory bowl, a sink or similar installation there to provide a small, compact and easily accessible and operable device to control volume of flow of hot and cold water and proportional mixing thereof, as desired.

Another object of the invention is to provide a valve of the character referred to that opens by a pull on the handle thereof, closes by a push thereon and proportions the mixture of hot and cold water by rotation of said handle in one direction or the other.

A further object of the invention is to provide a novel and improved mixing valve in which discharge into the lavatory occurs through the center of the handle.

A still further object of the invention is to provide a valve as characterized above that is readily disassembled and assembled from the front thereof and through the center of the handle, the same being completely accomplished with the aid of but one tool—a screw driver. It is, therefore, a simple matter, not requiring mechanical skill, to replace seals employed in the valve in a rapid and expeditious manner.

A yet further object of the invention is to provide a mixing and shut-off valve in which the flow from two sources is proportioned before the flow enters a mixing chamber, said mixed flow proceeding inwardly to the center or axis of the valve and discharging axially through a single controller that sets the mixing proportion and the rate of discharge flow from the valve.

A further object of the invention is to provide a valve as above characterized, in which mixing and shut-off are independently accomplished, thereby obviating accidental creeping of the parts during setting of the valve for desired mix or rate of flow.

A still further object of the invention is to provide a mixing and shut-off valve in which mixing and shut-off are separate operations, enabling provision thereof in a short-coupled valve assembly with the discharge flow taking place on the axial center of the valve and through a single controller or handle by means of which mixing and shut-off are accomplished.

A yet further object of the invention is to provide a valve as characterized in the paragraph next above that, because of its small unitary size and because it has a discharge flowing axially through the controller, is adapted to operatively combine with and be housed in the hollow of an integral lavatory or sink extension, thereby minimizing costly installation, as is the case where mixing valves discharge along a line or on a plane that is offset from the controller or handle.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawings. However, said drawings merely show, and the following description merely describes, preferred embodiments of the present invention, which are given by way of illustration or example only.

In the drawings, like reference characters designate similar parts in the several views.

Figure 1:
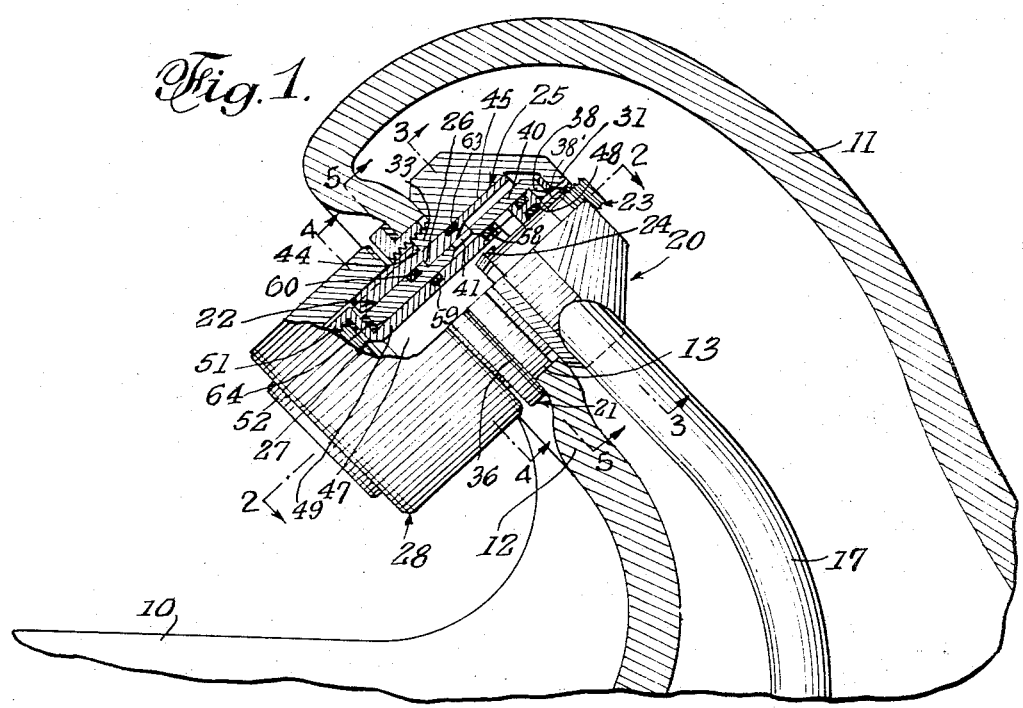
FIG. 1 is a partial elevational and partial sectional view, in closed position, of one form of the present mixing valve in operative position in a lavatory (shown in cross-section).

FIGS. 3, 4, and 5 are cross-sectional views as taken, respectively, on the lines 3—3, 4—4, and 5—5 of FIG. 1.

FIG. 6 is a perspective view of the fixed body assembly of said mixing valve.

FIG. 7 is a similar view of a nut for locking said body in operative position on a lavatory.

FIGS. 8 and 9 are perspective views from opposite ends of a water-mixing sleeve rotationally movable in said body.

FIG. 10 is a quarter-section plan view of another form of mixing and shut-off valve according to the present invention, the valve being shown closed.

FIG. 11 is a cross-sectional view as taken on the line 11—11 of FIG. 10.

FIG. 12 is a view similar to FIG. 10 showing the valve open to flow.

FIG. 13 is a view similar to FIG. 11 with the valve in the position of FIG. 12.

FIG. 14 is a perspective view of one of the components of the latter valve.

FIG. 15 is an elevational view, partly broken away to show detail, of another component of said valve.

FIG. 16 is a quarter-section elevational view of a modification that is especially adapted for use in a sink installation and shown closed.

FIG. 17 is a similar view showing said modified valve open.

FIG. 1 shows a portion of a lavatory comprising the usual bowl 10 and in this instance, integrally formed with a hollow extension 11 (preferably at the rear of the bowl) having a forward wall 12 in which an opening 13 is provided.

Figure 2:
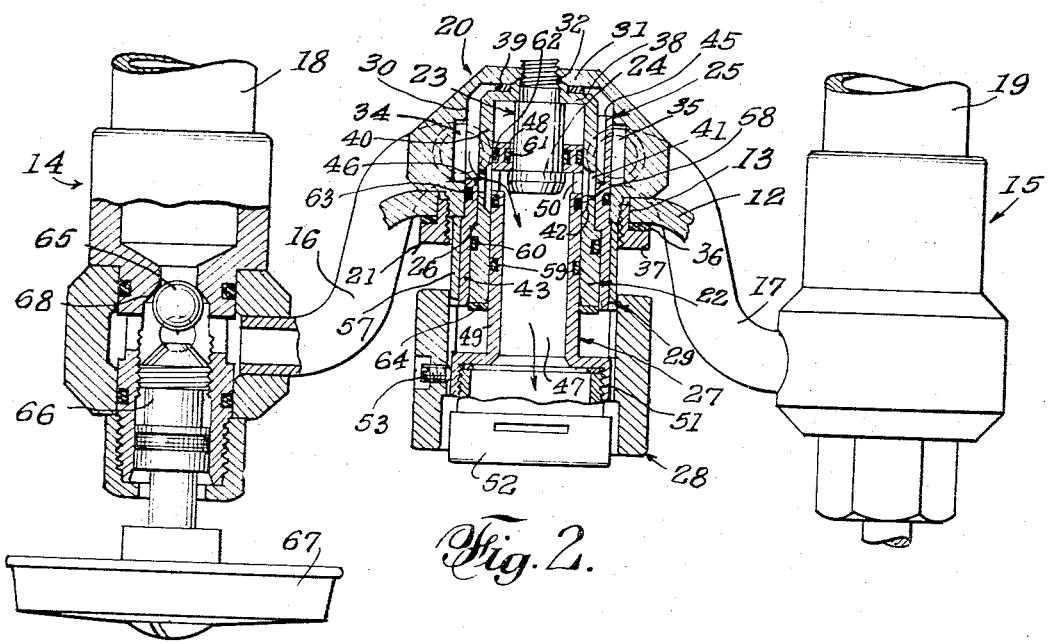
FIG. 2 is a schematic view showing said mixing valve in longitudinal section and in open position, and valve-controlled hot and cold water inlets to said mixing valve, the section of mixing valve being taken on the line 2—2 of FIG. 1.

The present mixing valve, as disclosed in FIGS. 1 to 9, is carried by the wall 12 and, as seen in FIGS. 1 and 2, resides, in part, within the hollow extension 11, and, in part, extends forwardly from said wall 12. Said valve is connected to two separate but similar anti-siphon and shut-off valves 14 and 15 by means of separate tubes 16 and 17, said valves being connected to separate supply lines 18 and 19—one to supply cold water and the other hot water.

The present valve 14 comprises, generally, a body 20 to which the tubes 16 and 17 are connected, a nut 21 to lock said body to the wall 12, a tubular stud 22 extending coaxially and forwardly from the rear of said body, a screw stud 23 to fixedly connect the tubular stud to the body and providing a forward movement-limiting stop 24, a mixing sleeve 25 around the outside of stud 22 and retained against longitudinal movement relative to said stud 22 by interengaging abutments 26 on said stud and sleeve, a spool 27 within the tubular stud 22 that is both rotational and longitudinally movable, the latter between a retracted position closing the valve to flow and a projected position against stop 24 to provide full flow and having intermediate positions to vary the flow, as desired, a control knob 28 fixedly connected to said spool and both rotational and longitudinally movable to move said spool accordingly, and means 29 on both the body 20 and the sleeve 25 to limit the rotational movement of the latter relative to the body.

The body 20, preferably of metal, is formed with a cylindrical bore 30 that is open at the forward end of the body and terminates at a rear wall 31 in which is provided a through screw seat 32. At its forward end, the body is provided with an externally threaded collar 33 of a size to loosely fit into the opening 13 of the lavatory wall 12, with the body residing behind said wall within the hollow of the extension 11.

The tubes 16 and 17, in spaced parallelism on opposite sides of the axial center of said body, are in communication with bore 30 by way of cored pockets 34 and 35, respectively, said pockets constituting enlargements of the bore, as can be seen in FIG. 3.

The nut 21 is internally threaded for connection with the collar 33 when applied from the outside, a compressible washer 36 being interposed between the flange 37 of said nut and the outer face of the wall 12.

The tubular stud 22 has an end wall 38 that is clamped against the end wall 31 of the valve body by the screw stud 23, a compression washer 39 being interposed between said walls 31 and 38 to seal the rearward end of the bore 30 of said body. Said stud 22 has a tubular wall 40 in which is provided a set of ports 41 that are open on the inside to inwardly flaring pockets 42. Forward of said ports, the outer surface of wall 40 has an annular shoulder 26' (FIG. 6) which is one of the mentioned abutments 26. The outer diameter of said wall 40, both at the reduced rearward portion in which ports 41 are provided and in the enlarged portion forward of the shoulder 26', is smaller than the bore 30, the annular space thus formed accommodating the sleeve 25. A vent 38' in wall 38 and through the body wall 31 vents the interior hollow of stud 22.

The screw stud 23 is diametrally smaller than the inner diameter of the tubular stud 22 to define an annular space therebetween that is occupied by the spool 27. The stop 24 on said stud comprises a plastic ring that is backed by a forward enlargement of said stud. As shown, said stop ring is forwardly spaced from the end wall 38 of the tubular stud 22.

The mixing sleeve 25 has an inner annular shoulder 26" (FIGS. 8 and 9) that is the other of the mentioned abutments 26. A forward extension 43 of said sleeve extends from the body 20 and has a rear annular shoulder 44 that abuts the forward end of body collar 33, the same cooperating with the abutments 26 to hold said sleeve in the bore 30 so that the same may move rotationally only. Said sleeve, as may be seen in FIG. 2, has a rearward end 45 that is at least coextensive longitudinally with the length of the pockets 35 in the valve body. Said end 45 is provided with an end-open arcuate opening 46 that, as seen in FIG. 3, provides for communication between body bore 30 and pockets 34 and 35 according to the rotational adjustment of sleeve 25. FIG. 3 shows a central or equal-mix position in which the bore 30 receives flow from tubes 16 or 17 in equal amounts. A clockwise turn of said sleeve will close off tube 17 and provide flow into bore 30 only from tube 16. A counter-clockwise turn of said sleeve will close off tube 16 and open the bore 30 to flow from tube 17. Of course, intermediate positions are available wherein the flow from one of said tubes is proportionally greater than from the other to vary the mix in the bore 30 accordingly.

It will be seen that the sleeve 25 only proportions the mix and is not depended on for shutting off the flow into bore 30 since one or both tubes 16 and 17 are always open to flow therefrom.

The spool 27 has a rotational and sliding fit in the tubular stud 22 and affords a central outlet flow passage 47. At its rearward end said spool is provided with an inner flange 48 that fits over the stud 23 for sliding movement between the mentioned end wall 38 of the tubular stud 25 and the stop 24. The spool has a tubular wall 49 extending forwardly from said flange 48, the same having therein a set of ports 50 adjacent to the forward face of the flange 48. When the spool is fully retracted, as in FIG. 1, said latter ports are out of register with the ports 41 of the stud 22, thereby closing off flow from said ports into the passage 47. When the spool is moved longitudinally forward, said two sets of ports are brought into partial or full register (FIG. 2), establishing a flow through said ports into passage 47.

The forward end of the spool 27 is provided with an internally threaded enlargement 51 to receive a conventional aerator 52 through which discharge water from passage 47 must pass.

The knob 28 is shown as a tubular member that, by means of a set screw 53, is secured to said forward enlargement of the spool. It will be clear, therefore, that said spool is moved longitudinally merely by a push or pull actuation of the knob 28. Rotational movement of the knob will also rotate said spool but this rotation movement of the spool is immaterial to its operation.

As can best be seen in FIG. 4, said knob and the sleeve 25 have a sliding key connection comprising diametrally opposed key projections 54 on the outside of the forward extension 43 of said sleeve, and keyways 55 in the knob into which said keys slidingly engage. It will be evident that the rotational movement of the knob will cause the sleeve 25 to rotate, as hereinbefore described, to proportion the water mix from tubes 16 and 17.

The means 29 comprises the opposite longitudinal abutment edges 56 of said keys 54 and a pair of forward projections 57 on the body 20. As can be seen in FIG. 5, the rotation of the sleeve 25 by the knob 28 is limited by said projections 57 as they stop knob manipulation when engaged by abutment edges 56 on one side or the other of the keys 54.

When the present mixing valve is in closed position, flow from ports 41 is sealed against leakage between the tubular stud 22 and the spool 27 is sealed by O-rings 58 and 59 carried by said spool. An O-ring 60 is carried by the stud 22 and seals between said stud and the mixing sleeve 25. The flange-provided inward end of the spool 27 has an O-ring 61 that seals against the connecting stud 23, and an O-ring 62 that seals against the tubular stud when the valve is open to prevent rearward leakage into the space behind the projected spool. Also, an O-ring 63, on the outside of the sleeve 25, seals against the body bore 30 forward of the pockets 34 and 35 in the body. The stop 24 is preferably non-metallic as is a washer 64 between the forward end of the stud 22 and the enlargement 51 on the spool. The same obviates a metal-to-metal contact between the longitudinally movable spool and the studs 22 and 23 during opening and closing of the valve.

The anti-siphon and shut-off valves 14 and 15 serve as conventional flow-stopping valves such as are commonly used to close flow to a tap or faucet having two sources of supply water. To this end, the valves 14 and 15 are each provided with a ball 65, and a threaded shaft 66 manipulated by a handle 67 to clamp said ball against a seat 68, thereby closing inlet flow either from supply line 18 to tube 16 or supply line 19 to tube 17.

In the normal operation, however, the shafts 66 of valves 14 and 15 are retracted and said valves so positioned that the balls thereof rest upon their respective seats. Supply pressure flow in lines 18 and 19 will lift said balls so that the flow may reach the described mixing valve through tubes 16 and 17 for outward flow through passage 47.

When the mixing valve is closed and the tubes 16 and 17 are in communication through pockets 34 and 35 and bore 30, cross flow between the two water supply lines 18 and 19 is prevented by the balls 65 acting as check valves by seating on their respective seats. Thus, hot water cannot flow into the cold water line nor can cold water flow into the hot water line.

It will be understood that the wall 12a of FIGS. 10 and 11 is similar to the wall 12 of the hollow extension 11 of the lavatory and that the valve disclosed in FIGS. 10 to 15 is mounted similarly to the previously-described valve to direct its discharge flow.

In the above-described valve construction, the inlet flow from tubes 16 or 17 is from said tubes, according to the rotational setting of the mixing sleeve 25, and enters the interior of said sleeve in a direction toward the axial center of the valve. This mixture then flows in the same direction, as controlled by shut-off and flow-rate controlling spool 27, to enter the central flow passage 47 of said spool to discharge in an axial path through the aerator 52 which is disposed within the annulus formed by the tubular knob 28. It will be noted that this arrangement of mixing chamber and shut-off is, at least, partly coincidental longitudinally, thereby providing a short-coupled construction that produces a valve of ample flow capacity and yet of a stubby or short design, as shown.

As shown in FIG. 1, the valve is admirably suited for incorporation, as a small unitary flow device that embodies a single controller to control both mix and rate of flow, in the front wall 12 of the integral hollow extension 11 of a lavatory bowl or the like. By disposing the valve at a suitable angle to discharge into the bowl 10, the control knob 28 that encircles the flow is readily accessible for being pulled to open the valve, pushed to close the same, and turned in either direction, according to the temperature of mix of water from the tubes 16 and 17 that is desired. Substantially all that is exposed or projects from the extension 11 is the knob 28 and such outer mounting fittings as are necessary to secure the valve in place.

The valve that is illustrated in FIGS. 10 to 15 is quite similar to the valve above described, having a body 20a to which inlet flow tubes 16a and 17a are connected, a nut 21a to lock said body to wall 12a of the lavatory extension, a tubular stud 22a extending forwardly from the rear of said body 20a, a screw stud 23a to fixedly connect the tubular stud to the body and providing a forward movement-limiting stop 24a, a mixing sleeve 25a around the outside of the stud 22a held against longitudinal movement but rotational relative to the fixed body and hollow stud, a spool 27a within the tubular stud 22a that is both rotationally and longitudinally movable to open and close the valve to flow and adjust the flow rate, a controller or handle 28a fixedly connected to the spool 27a and both rotationally and longitudinally movable to move said spool accordingly, and means 29a on both the body 20a and the sleeve 25a to limit the rotational movement of the latter relative to the body.

The body bore 30a is open at the forward end and is closed at the rear by a wall 31a having a screw seat 32a. Said body is mounted on the wall 12a by the nut 21a similarly to the manner described in connection with the valve of FIG. 1. In this case, said nut 21a is provided with a forwardly extending skirt 37a.

As shown in FIGS. 11 and 12, each of the tubes 16a and 17a enters the bore 30a of the valve body, as before. Instead of the anti-siphon valves 14 and 15 being provided as separate units, the anti-siphon function thereof is afforded by means of fittings 14a and 15a in which are contained balls 65a that, under pressure in said tubes 16a and 17a, normally close flow through the valve seats 68a in the body bore 30a.

In this modification, the mixing sleeve 25a, on the end 45a thereof, is provided with a cam face 66a that, according to the rotated position of said sleeve, is clear of said balls 65a allowing them to close seats 68a, or retract said balls, thereby opening said seats to a greater or lesser extent according to which portions of the face 66a engage said balls. Thus, as shown in FIG. 11, where both balls are partly retracted by similar but radially spaced portions of the cam, flow from both tubes 16a and 17a, in equal amounts, will enter the mixing chamber of the valve, and, as shown in FIG. 12, where one ball remains seated to close flow from tube 16a and the deepest part of the cam face 66a retracts the ball controlling flow from the tube 17a, only the flow from the latter tube enters the mixing chamber. Of course, intermediate angular positions of the sleeve 25a between the 90° limit of adjustment that is shown, will provide mixing in various proportions, as desired.

Except that the handle 28a is provided with a rearwardly extending portion that is housed within the skirt 80, when the valve is shut off, and serves to cover over portions of the sleeve 25a as well as the means 29a, the details of the valve shown in FIGS. 10 to 15 are quite similar to those of the valve in FIG. 1.

FIG. 15 shows that the ports 41a that pass the mixed flow to the ports 50a and then to the axial discharge passage have inner recesses or pockets that are shaped to provide a gradual rather than a sudden opening and shut-off under control of the sleeve 27a.

FIGS. 16 and 17 show an example of a valve, as above disclosed, that is modified so the same is more particularly adapted for use in a sink by being mounted so that a swing spout 70 may be moved to discharge into one or the other sink of a double sink, said spout being mounted coaxially with the controller or handle.

As shown, said modification comprises a longitudinal and preferably vertical body 20b in which extend supply tubes 16b and 17b in a longitudinal direction so that the discharge from said tubes enters cored pockets 34b that are open to the bore 30b of said body, a nut 21b to lock said body to a wall 12b (the top wall of a double-sink divider or the like), a tubular stud 22b extending coaxially and upwardly from the lower end of body 20b and having a central axial discharge passage 47b which, in this case, is closed at the lower end of the valve by a cap 38b and is open at its upper end, a combined mixing and shut-off sleeve 25b between the stud 22b and the wall of the bore 30b, a knob 28b mounted on the upper end of sleeve 25b, and means 29b to limit the rotation of said sleeve by said knob relative to the body 20b.

The sleeve 25b is provided with ports 41b that combine with the pockets 34b to control the mix according to the rotational adjustment of said sleeve, much in the same way that the end 46 of the sleeve 25 and the pockets 34 and 35 control the mix in the form of valve shown in FIGS. 1 to 9. O-rings 60b and 63b, both carried by the stud 22b, form a leakproof shut-off seal around the ports 41b, and O-rings 58b and 59b engage the wall of bore 30b to seal between the body and the sleeve 25b. The latter rings seal against leakage from the ends of the valve in both open and closed position, while the rings 60b and 63b, as stated, effect the shut-off seal.

A set of ports 50b in the stud pass the mixed flow, received from the ports 41b, in to the axial discharge passage. Thus, as in the two earlier forms of the invention, the flow from pockets 34b to passage 47b is inward toward the axial center of the valve.

As shown, the stud 22b extends into the hollow of the knob 28b, the same being provided with a bumper ring 24b that limits the valve-opening movement of the sleeve 25b. The swivel connection 71 is generally conventional.

While the foregoing has illustrated and described what are now contemplated to be the best modes of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claims.

I claim:

1. A mixing valve comprising: a body having two flow inlets and a bore adapted to receive the flow from said inlets; rotationally and axially movable means within said bore adapted to move rotationally in order to proportion the flow from said inlets to said bore and provided with a mixing chamber inward of the mentioned bore, and to move axially to turn on and shut off the flow; a hollow handle on the axis of the bore and connected to the said means to set the latter according to the proportion of mix desired; an axially fixed tubular member within the said means and having a longitudinal flow passage coaxial with the hollow handle and having ports to conduct flow from the mixing chamber into said passage for discharge through the hollow of the handle; the said movable means including a hollow spool within the passage in the fixed member and provided with ports connecting the ports of the fixed member with the hollow thereof for discharge longitudinally therethrough and through the hollow handle, the handle being fixedly connected to said spool to both rotate and move the same longitudinally.

2. A mixing valve comprising: a body having an outer mixing chamber and provided with two inlets to said chamber; a member having an inner chamber; a fixed annular member having an annular wall separating said chambers and provided with ports communicating said chambers; a tubular member in the inner chamber and guided by the annular member for both rotational and longitudinal movement relative to the fixed member; ports in the tubular member movable therewith relative to the ports in the fixed member to control flow through said ports into the hollow of the tubular member; a tubular handle fixedly connected to said tubular member to both rotate and move the same longitudinally and slidingly connected to the member having the inner chamber to rotate the latter; and means to limit the rotational movement of the member having the inner chamber.

3. A mixing valve according to claim 2 in which each inlet is provided with a valve seat where the same enters the outer chamber and with a ball valve to control flow through said valve seat, and the inner member is provided with cam means to engage said balls to hold the same in spaced relation to the valve seats.

4. A mixing valve comprising: a body having a cylindrical bore and provided with a rear end wall closing said bore; two water inlets to said bore on opposite sides of the bore axis; a tubular stud extending axially fixedly from said end wall of the body coaxially with said body bore and in spaced relation thereto, said tubular stud having a set of ports; a mixing sleeve in said bore around said stud with a longitudinal passage open to said ports and having a flow opening in the portion thereof in longitudinal register with said water inlets; a knob connected to said sleeve to turn the latter to vary the angular relationship of said opening and the two inlets to vary the inlet flows through said opening to said longitudinal passage and, accordingly, to vary the proportion of mixture of said two flows reaching the ports in the stud; means interconnecting said sleeve and the body to limit sleeve rotation to positions between an equally proportioned mix and flow only from one inlet or the other; and means connected to the knob and having a longitudinal discharge passage on said axis to open said ports to flow into said passage when the knob is pulled.

5. A mixing valve comprising: a body having a cylindrical bore and provided with a rear end wall closing said bore; two water inlets to said bore on opposite sides of the bore axis; a tubular stud extending axially fixedly from said end wall of the body coaxially with said body bore and in spaced relation thereto, said tubular stud having a set of ports; a mixing sleeve in said bore around said stud with a longitudinal passage open to said ports and having a flow opening in the portion thereof in longitudinal register with said water inlet; a knob connected to said sleeve to turn the latter to vary the angular relationship of said opening and the two inlets to vary the inlet flows through said opening to said longitudinal passage and, acocrdingly, to vary the proportion of mixture of said two flows reaching the ports in the stud; means interconnecting said sleeve and the body to limit sleeve rotation; and means connected to the knob and having a longitudinal discharge passage on said axis to open said ports to flow into said passage when the knob is pulled, said latter means comprising a spool having both rotational and longitudinal engagement with the stud and provided with ports that are in register with the ports in said stud when the knob is pulled.

6. A mixing valve comprising: a body having a cylindrical bore and provided with a rear end wall closing said bore; two water inlets to said bore on opposite sides of the bore axis; a tubular stud extending axially fixedly from said end wall of the body coaxially with said body bore and in spaced relation thereto, said tubular stud having a set of ports; a mixing sleeve in said bore around said stud with a longitudinal passage open to said ports and having a flow opening in the portion thereof in longitudinal register with said water inlets; a knob connected to said sleeve to turn the latter to vary the angular relationship of said opening and the two inlets to vary the inlet flows through said opening to said longitudinal passage and, accordingly, to vary the proportion of mixture of said two flows reaching the ports in the stud; means interconnecting said sleeve and the body to limit sleeve rotation to positions between an equally proportioned mix and flow only from one inlet or the other; means connected to the knob and having a longitudinal discharge passage on said axis to open said ports to flow into said passage when the knob is pulled, said latter means comprising a spool having both rotational and longitudinal engagement with the stud and provided with ports that are in register with the ports in said stud when the knob is pulled; and means carried by the body to limit the longitudinal movement of said knob and spool under pull on the knob.

7. A mixing valve comprising: a body having a cylindrical bore and provided with a rear end wall closing said bore; two water inlets to said bore on opposite sides said bore; a tubular stud extending axially fixedly from said end wall of the body coaxially with said body bore and in spaced relation thereto, said tubular stud having a set of ports; a mixing sleeve in said bore around said stud with a longitudinal passage open to said ports and having a flow opening in the portion thereof in longitudinal register with said water inlets; a knob connected to said sleeve to turn the latter to vary the annular relationship of said opening and the two inlets to vary the inlet flows through said opening to said longitudinal passage and, accordingly, to vary the proportion of mixture of said two flows reaching the ports in the stud; means interconnecting said sleeve and the body to limit sleeve rotation to positions between an equally proportioned mix and flow only from one inlet or the other; means connected to the knob and having a longitudinal discharge passage on said axis to open said ports to flow into said passage when the knob is pulled, said later means comprising a spool having both rotational and longitudinal engagement with the stud and provided with ports that are in register with the ports in said stud when the knob is pulled; means carried by the body to limit the longitudinal movement if said knob and spool under pull on the knob; and a retraction-limiting abutment for the spol when the knob is pushed to move the ports in the spool out of flow register with the ports in the stud to shut off flow to said passage.

8. A mixing valve comprising: a body having a cylindrical bore and provided with a rear end wall closing said bore; two water inlets to said bore on opposite sides of the bore axis; a tubular stud extending fixedly from said end wall of the body coaxially with said body bore and in spaced relation thereto, said tubular stud having a set of ports; a mixing sleeve within said bore and around said stud and rotational on said axis; abutment means on the body and the sleeve to hold the latter non-movable longitudinally; a flow-controlling spool movable in said stud both rotationally and longitudinally and having ports that, when in register with the stud ports, open flow from said inlets through said ports into the axial hollow of said spool; a knob fixedly connected to the spool to move the latter between retracted flow-closing position and projected flow position; a sliding key connection between said knob and sleeve to rotate the latter only; and means to limit said rotation.

9. A mixing valve comprising: a body having a cylindrical bore and provided with a rear end wall closing said bore; two water inlets to said bore on opposite sides of the bore axis, a tubular stud extending fixedly from said end wall of the body coaxially with said body bore and in spaced relation thereto, said tubular stud having a set of ports; a mixing sleeve within said bore and around said stud and rotational on said axis; abutment means on the body and the sleeve to hold the latter non-movable longitudinally; a flow-controlling spool movable in said stud both rotationally and longitudinally and having ports that, when in register with the stud ports, open flow from said inlets through said ports into the axial hollow of said spool; a knob fixedly connected to the spool to move the latter between retracted flow-closing position and projected flow position; a sliding key connection between said knob and sleeve to rotate the latter only; and means to limit said rotation, said latter means comprising fixed stops on the body, and abutment edges on the sleeve having rotational abutting engagement with said fixed stop.

10. A mixing valve according to claim 9 provided with means interengaging the body and the spool to limit the projected position of the latter.

11. A mixing valve according to claim 9 provided with means interengaging the body and the spool to limit the projected position of the latter, said knob comprising a tubular member encircling the spool, the flow discharge from the axial hollow of the spool passing outwardly through the interior of the knob.

12. A mixing valve comprising: a body having a cylindrical bore on a central axis, said body being provided with a rearward end wall closing said bore; two water inlets to said bore on opposite sides of said axis and open to said bore adjacent to said wall; a tubular stud extending forwardly from said end wall in spaced relation to said bore and coaxial with said bore and provided with a set of ports; a coaxial fastener stud connecting the tubular stud to said end body wall and partly longitudinally coextensive with said tubular stud; a stop ring on the forward end of the fastener stud; a mixing sleeve disposed in the space between the body bore and the outside of the tubular stud and provided at its inward end with a flow opening that is longitudinally in register with said two water inlets; a knob connected to said sleeve to turn the latter to vary the angular position of said opening relative to the inlets to thereby regulate the mixing proportion of water from said inlets; a sliding connection between said knob and sleeve whereby the knob is longitudinally movable relative to the sleeve; a spool within the hollow of the tubular stud and provided with a portion in movement-limiting engagement with said end wall of the tubular stud and the stop ring on the fastener stud, said spool having ports that are in register with the ports in the tubular stud only when said spool is projected to move the mentioned portion near or against said stop ring; means fixedly securing said knob to said spool so that longitudinal movement of said knob moves the spool longitudinally between retracted flow-closing position and projected flow position; and rotation-limiting means on both the body and the sleeve to limit the rotated watermixing position of the opening in the mixing sleeve relative to the two water inlets.

13. A mixing valve for controlling both the volume and temperature of water dispensed therefrom comprising: a valve body having a longitudinal bore open at one end and with hot and cold water inlet passageways communicating radially with the bore; a rotational mixing sleeve within the bore to control flow from said inlets to the bore according to the rotationally adjusted position of the sleeve; means on both the body and the sleeve to limit said sleeve position; means to seal between said sleeve and the bore against longitudinal flow from the bore beyond the open end thereof; a fixed hollow stud coaxial with the body bore and engaged with the mixing sleeve to hold the latter against longitudinal movement; ports in said stud to pass flow from the bore in a direction toward the axis of the bore; an axially hollow spool within the hollow stud and having ports cooperating with the ports in the stud to control the volume of flow therethrough into the axial hollow of the spool.

14. A mixing valve according to claim 13 in which the spool, on both sides of the ports therein, is provided with sealing rings engaged with the inner surface of the fixed stud to seal between the stud and spool, and a single controller rotates the mixing sleeve and both rotates and longitudinally moves the spool.

References Cited

UNITED STATES PATENTS 3,080,570    3/1963    Weddendorf _____ 137—636.4

M. CARY NELSON, *Primary Examiner.*

W. CLINE, *Assistant Examiner.*